United States Patent
Turner et al.

(10) Patent No.: US 11,077,365 B2
(45) Date of Patent: Aug. 3, 2021

(54) LOW LATENCY DATAGRAM-RESPONSIVE COMPUTER NETWORK PROTOCOL

(71) Applicant: Niantic, Inc., San Francisco, CA (US)

(72) Inventors: Peter Turner, Redwood City, CA (US); Jaime Ivan Cervantes, Sunnyvale, CA (US); Si ying Diana Hu, Mountain View, CA (US)

(73) Assignee: Niantic, Inc., San Francisco, CA (US)

( * ) Notice: Subject to any disclaimer, the term of this patent is extended or adjusted under 35 U.S.C. 154(b) by 122 days.

(21) Appl. No.: 16/450,904

(22) Filed: Jun. 24, 2019

(65) Prior Publication Data
US 2020/0001180 A1    Jan. 2, 2020

Related U.S. Application Data

(60) Provisional application No. 62/690,578, filed on Jun. 27, 2018.

(51) Int. Cl.
*A63F 13/358* (2014.01)
*A63F 13/34* (2014.01)
*A63F 13/332* (2014.01)

(52) U.S. Cl.
CPC .......... *A63F 13/358* (2014.09); *A63F 13/332* (2014.09); *A63F 13/34* (2014.09); *A63F 2300/534* (2013.01)

(58) Field of Classification Search
CPC ...... A63F 13/332; A63F 13/34; A63F 13/358; A63F 2300/534
See application file for complete search history.

(56) References Cited

U.S. PATENT DOCUMENTS 6,865,169 B1 *   3/2005   Quayle ................. H04L 63/083
                                                              370/335
10,880,407 B2 * 12/2020   Reynolds .............. H04W 84/18
(Continued)

FOREIGN PATENT DOCUMENTS

CN    102843349 A    12/2012
CN    102984186 A     3/2013
(Continued)

OTHER PUBLICATIONS

PCT International Search Report and Opinion, PCT Application No. PCT/US2019/038984, dated Oct. 10, 2019, 9 pages.
(Continued)

*Primary Examiner* — Steve Rowland
(74) *Attorney, Agent, or Firm* — Fenwick & West LLP (57) ABSTRACT

Systems and methods for providing a shared augmented reality environment are provided. In particular, the latency of communication is reduced by using a peer-to-peer protocol to determine where to send datagrams. Datagrams describe actions that occur within the shared augmented reality environment, and the processing of datagrams is split between an intermediary node of a communications network (e.g., a cell tower) and a server. As a result, the intermediary node may provide updates to a local state of a client device when a datagram is labelled peer-to-peer, and otherwise provides updates to the master state on the server. This may reduce the latency of communication and allow users of the location-based parallel reality game to see actions occur more quickly in the shared augmented reality environment.

20 Claims, 4 Drawing Sheets

(56) References Cited

U.S. PATENT DOCUMENTS

| | | | |
|---|---|---|---|
| 2007/0104190 A1* | 5/2007 | Harmjanz | H04L 29/06 370/389 |
| 2008/0192756 A1* | 8/2008 | Damola | H04L 61/35 370/400 |
| 2009/0006473 A1* | 1/2009 | Elliott | H04H 60/80 |
| 2009/0075642 A1* | 3/2009 | Rantapuska | H04W 88/04 455/422.1 |
| 2011/0158171 A1* | 6/2011 | Centonza | H04L 12/2856 370/328 |
| 2013/0034047 A1* | 2/2013 | Chan | H04W 40/00 370/315 |
| 2013/0159398 A1 | 6/2013 | Weizman | |
| 2014/0317173 A1* | 10/2014 | Karkkainen | H04N 21/238 709/203 |
| 2015/0095402 A1 | 4/2015 | Fraccaroli | |
| 2015/0189008 A1* | 7/2015 | Karkkainen | H04N 21/2343 709/204 |
| 2016/0150005 A1 | 5/2016 | Choi et al. | |
| 2016/0240010 A1 | 9/2016 | Rosenthal et al. | |
| 2017/0310500 A1 | 10/2017 | Dawes | |
| 2018/0095541 A1 | 4/2018 | Gribetz et al. | |
| 2018/0359811 A1* | 12/2018 | Verzun | H04L 63/0428 |

FOREIGN PATENT DOCUMENTS

| | | |
|---|---|---|
| KR | 10-2008-0101891 A | 11/2008 |
| KR | 10-2010-0108354 A | 10/2010 |
| TW | 463840 | 11/2001 |
| WO | WO-2011/140242 | 11/2011 |

OTHER PUBLICATIONS

Taiwan Intellectual Property Office, Office Action, Taiwanese Patent Application No. 108122701, dated Jan. 31, 2020, 3 pages.

China National Intellectual Property Administration, Office Action, CN Patent Application No. 201990043252.3, dated Jun. 11, 2021, ten pages.

* cited by examiner

LOW LATENCY DATAGRAM-RESPONSIVE COMPUTER NETWORK PROTOCOL

CROSS-REFERENCE TO RELATED APPLICATIONS

This application claims the benefit of U.S. Provisional Application No. 62/690,578, filed Jun. 27, 2018, which is incorporated by reference.

FIELD

The present disclosure relates to computer network protocols, and in particular to protocols for providing low-latency wireless communication between devices within physical proximity of each other.

BACKGROUND

Computer networks are interconnected sets of computing devices that exchange data, such as the Internet. Communication protocols such as the User Datagram Protocol (UDP) define systems of rules for exchanging data using computer networks. UDP adheres to a connectionless communication model without guaranteed delivery, ordering, or non-duplicity of datagrams. A datagram is a basic unit for communication and includes a header and a payload. The header is metadata specifying aspects of the datagram, such as a source port, a destination port, a length of the datagram, and a checksum of the datagram. The payload is the data communicated by the datagram. Computing devices communicating using UDP transmit datagrams to one another via the computer network.

Connectionless communication protocols such as UDP generally have lower overhead and latency than connection-oriented communication protocols like the Transmission Control Protocol (TCP), which establish connections between computing devices before transmitting data. However, existing connectionless communication protocols are inadequate for data transfers that require less latency than is accommodated by the existing art. For example, an augmented reality (AR) environment streaming at 60 frames per second (FPS) may require latency an order of magnitude lower than provided by current techniques. In such an AR environment, the frames are spaced at approximately sixteen millisecond intervals, while current network protocols typically provide latency of approximately one hundred milliseconds (or more).

As such, with existing techniques, a user does not interact with the current state of the AR environment, only a recent state. A user using a client to interact with the AR environment over a computer network may interact with an old state of AR positional data. For example, in an AR game, a player may see an AR object at an old location (e.g., where the object was 100 milliseconds previously), while the AR positional data in fact has a new location for the object (e.g. the AR object has been moved by another player). This latency in communication between the client and a server hosting or coordinating the AR game may lead to a frustrating user experience. This problem may be particularly acute where more than one user is participating in the AR game because the latency may cause a noticeable delay between the actions of one player showing up in other players' views of the AR environment.

SUMMARY

Augmented reality (AR) systems supplement views of the real world with computer-generated content. Incorporating AR into a parallel-reality game may improve the integration between the real and virtual worlds. AR may also increase interactivity between players by providing opportunities for them to participate in shared gaming experiences in which they interact. For example, in a tank battle game, players might navigate virtual tanks around a real-world location, attempting to destroy each other's tanks. The movement of the tanks may be limited by real-world geography (e.g., the tanks move more slowly through rivers, move more quickly on roads, cannot move through walls, etc.).

Existing AR session techniques involve a server maintaining a master state and periodically synchronizing the local state of the environment at client devices to the master state via a network (e.g., the internet). However, synchronizing a device's local state may take a significant amount of time (e.g., ~100 s of milliseconds), which is detrimental to the gaming experience. The player is, in effect, interacting with a past game state rather than the current game state. This problem may be particularly acute where more than one user is participating in the AR game because the latency causes a noticeable delay between the actions of one player showing up in other players' views. For example, if one player moves an AR object in the world, other players may not see it has moved until one hundred milliseconds (or more) later, which is a human-perceptible delay. As such, another player may try to interact with the object in its previous location and be frustrated when the game corrects for the latency (e.g., by declining to implement the action requested by the player or initially implementing the action and then revoking it when the player's client device next synchronizes with the server).

This and other problems may be addressed by processing datagrams at an intermediary node (e.g., a cell tower). Latency may be reduced using a peer-to-peer (P2P) protocol that exchanges game updates between clients connected to the same edge node without routing the updates via the game server. For example, using these approaches, latency may be reduced to ~10 milliseconds or less. Furthermore, this may increase bandwidth availability enabling a greater number of players to share a common AR experience.

In one embodiment, a method for updating a game state of a shared AR environment includes receiving, at an intermediary node, a datagram addressed to a target client device. The datagram includes data regarding an action that occurred in the shared augmented reality environment and an indicator of whether the datagram is P2P. The intermediary node, such as a cell tower, determines whether the datagram is peer-to-peer based on the indicator. If the datagram is P2P, the intermediary node sends the datagram to the target client device to update a local state of the shared AR environment at the target client device in view of the action that occurred. Otherwise, if the datagram is not P2P, the intermediary node sends the datagram to a server to update a master state of the shared AR environment at the server in view of the action that occurred. In further embodiments, the intermediary node also sends some or all of the datagrams it sends to the target client device to the server to update the master shared AR state.

DETAILED DESCRIPTION

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. Wherever practicable similar or like reference numbers are used in the figures to indicate similar or like functionality. Where elements share a common numeral followed by a different letter, the elements are similar or identical. The numeral alone refers to any one or any combination of such elements.

Example Computing Environment

Figure 1:
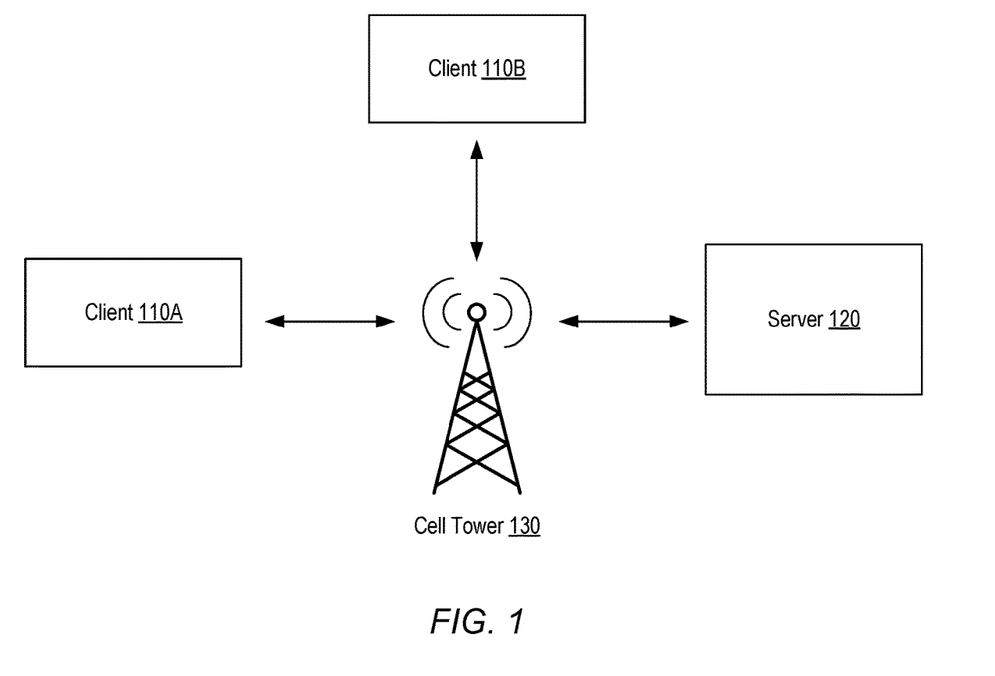
FIG. 1 illustrates a computer network in which the disclosed protocol may be used, according to one embodiment.

As disclosed herein, a datagram-responsive computer network protocol ("the disclosed protocol") may lower computer network latency (e.g., in one embodiment, the latency is ~10 milliseconds). FIG. 1 illustrates a computer network that communicates using the disclosed protocol, according to one embodiment. The figure illustrates a simplified example using block figures for purposes of clarity. The computer network includes two clients 110, a server 120, and a cell tower 130. In other embodiments the computer network may include fewer, additional, or other components, such as additional clients 110, servers 120, cell towers 130, or other network nodes. For example, the computer network may be a local area network (LAN) using one or more WiFi routers as network nodes rather than a cell tower 130.

A client 110 is a computing device such as a personal computer, laptop, tablet computer, smartphone, or so on. Clients 110 can communicate using the disclosed protocol. The server 120 is similarly a computing device capable of communication via the disclosed protocol. Clients 110 may communicate with the server 120 using the disclosed protocol, or in some embodiments may use a different protocol. For example, clients 110 may communicate with one another using the disclosed protocol but with the server 120 using TCP. In an embodiment, each client 110 includes a local AR module and the server 120 includes a master AR module. Each local AR module communicates AR data to local AR modules upon other clients 110 and/or the master AR module upon the server 120.

The cell tower 130 is a network node that serves as an intermediary node for end nodes such as clients 110. As described above, in other embodiments the computer network may include other network nodes replacing or in addition to a cell tower 130 but enabling similar communication. The cell tower 130 increases the range over which messages may be communicated. For example, a client 110A may send a message to a cell tower 130 which proceeds to transmit the message to a client 110B, where client 110A would not have been able to communicate with client 110B without the cell tower 130.

In an embodiment, client 110 communications may be routed through the server 120 or peer-to-peer (P2P). Communications routed through the server 120 may go from a first client 110A to the server 120 via the cell tower 130 and then back through the cell tower 130 to a second client 110B. In contrast, P2P communication may go from the first client 110A to the cell tower 130 and then directly to the second client 120B. Note that in some cases, the communications may pass through other intermediary devices, such as signal boosters. As used herein, a communication is considered P2P if it is routed to the target client 110B without passing through the server 120. For example, a message (e.g., a datagram) may be sent P2P if the target client 110B is connected to the same cell tower 130 as the sending client 110A and routed via the server 120 otherwise. In another embodiment, clients 110 communicate entirely using P2P. Furthermore, in some embodiments, UDP hole punching may be used to establish a connection among two or more clients 110.

In one embodiment, the clients 110 use a coordination service (e.g., hosted at the server and communicated with via TCP) to synchronize IP addresses. The clients 110 can then communicate (e.g., via UDP) using public facing IP addresses or a local area network (LAN). For example, a first client 110A might send a request via TCP to the coordination service to join a local AR shared environment. The coordination service may provide the first client 110A with the IP address of a second client 110B connected to the AR environment (e.g., via the same cell tower 130). The coordination service may also provide the first client's IP address to the second client 110B or the first client 110A may provide it directly using the second client's IP address (as provided by the coordination service). In some embodiments, the coordination service may prompt the second client 110B to approve the first client 110A (e.g., by requesting user confirmation or checking a list of approved clients 110 to connect with the second client 110B) before the second client's IP address is provided.

Figure 2:
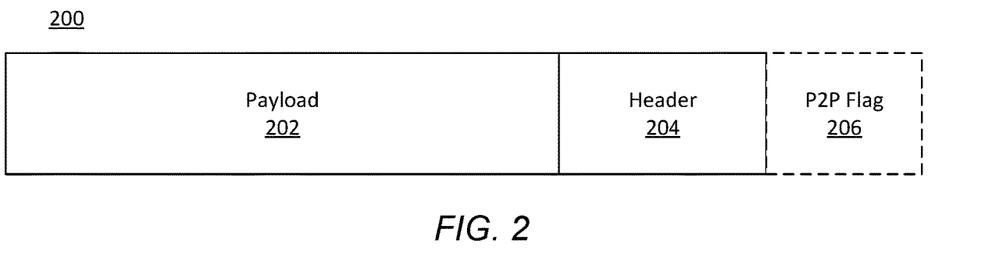
FIG. 2 illustrates a datagram configured according to the disclosed protocol, according to one embodiment.

FIG. 2 illustrates a datagram 200 configured according to the disclosed protocol, according to one embodiment. The datagram 200 includes a payload 202, which as described above is the content of the datagram 200. The datagram 200 also includes a header 204, a portion of which is a P2P flag 206, also known as an indicator. The header may be similar to a UDP header plus a P2P flag 206, or may contain different or additional metadata in addition to the P2P flag. The P2P flag is used to determine whether the datagram 200 is sent to the server 120 or is sent P2P to another client 110. In other embodiments the P2P flag 206 is replaced with one or more other indicators within the header providing similar functionality.

The cell tower 130 receives 405 a datagram 200 from client 110A and determines how to route the datagram based on the P2P flag 206. In one embodiment, the P2P flag 206 may be set by the sending client 110A to indicate that the datagram 200 should be sent P2P if possible. The cell tower 130 analyzes the datagram 200 and, assuming the P2P flag 206 indicates the datagram 200 should be sent P2P, determines whether the target client 110B is currently connected to the cell tower (e.g., by comparing an identifier of the target client 110B to a list of currently connected clients). If the target client 110B is connected to the cell tower 130, the datagram 200 is sent to it without going via the server 120. In contrast, if the target client 110B is not connected to the cell tower 130, the datagram 200 is sent to the server 120 to be sent on to the target client 110B (e.g., via a second cell tower 130 to which it is currently connected). For example, the server 120 might maintain a database or other list of which cell towers 130 are currently or have been recently connected to which client devices 110. In some embodiments, the cell tower 130 may send the datagram 200 to both the target client 110B and the server 120.

In another embodiment, the P2P flag 206 may be an identifier of an AR session, a user, a device, a game account, or the like. The cell tower 130 maintains a list of P2P flags 206 for which the datagram 200 should be sent P2P (or P2P if possible). The cell tower 130 analyzes 410 the datagram 200 to determine whether it should be sent via the server 120 or P2P. If the P2P flag 206 includes an identifier on the list, the datagram 200 is a P2P message and the cell tower 130 sends 415 the datagram 200 to the target client 110. For example, if the header 204 of the datagram 200 indicates the destination port is that of client 110B, the cell tower 130 sends 415 the datagram 200 to client 110B. In contrast, if the P2P flag 206 indicates the datagram 200 is not a P2P message, the cell tower 130 sends 420 the P2P flag 206 to the server 120. Alternatively, the list may indicate P2P flags 206 for messages that are not to be sent P2P, in which case the default behavior if the P2P flag 206 is not on the list is to send the corresponding datagram P2P to the target client (e.g., client 110B).

Example Intermediary Node

Figure 3:
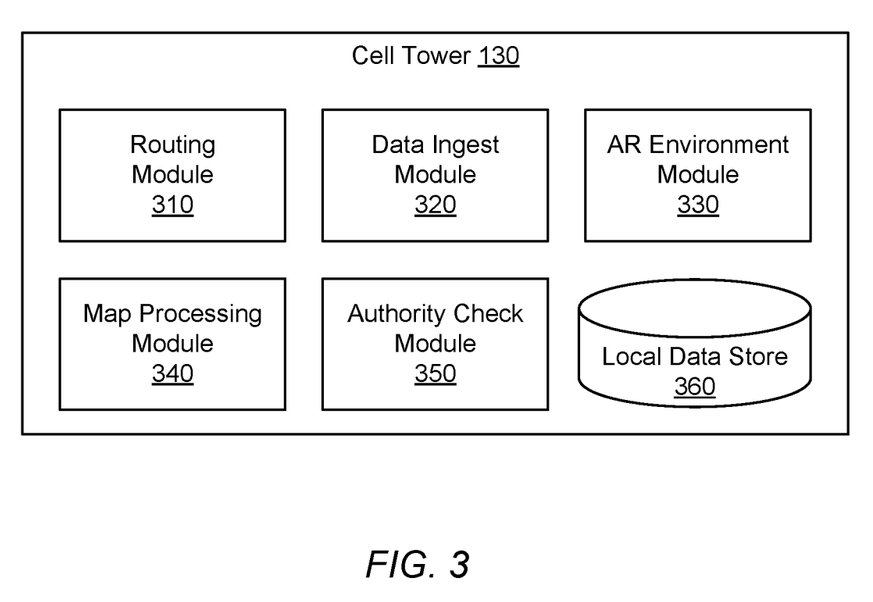
FIG. 3 is a block diagram illustrating the cell tower of FIG. 1, according to one embodiment.

FIG. 3 is a block diagram illustrating one embodiment of an intermediary node. In the embodiment shown, the intermediary node is a cell tower 130 that includes a routing module 310, a data ingest module 320, an AR environment module 330, a map processing module 340, an authority check module 350, and a local data store 360. The cell tower 130 also includes hardware and firmware or software (not shown) for establishing connections to the server 120 and clients 110 for exchanging data. For example, the cell tower 130 may connect to the server 120 via a fiberoptic or other wired internet connection and clients 110 using a wireless connection (e.g., 4G or 5G). In other embodiments, the cell tower 130 may include different or additional components. In addition, the functions may be distributed among the elements in a different manner than described.

The routing module 310 receives data packets and sends those packets to one or more recipient devices. In one embodiment, the routing module 310 receives datagrams 200 from clients 110 and uses the method described with reference to FIG. 4 to determine where to send the received datagrams. The routing module 310 may also receive data packets from the server addressed to either particular clients 110 or all clients that are connected to the cell tower. The routing module 310 forwards the data packets to the clients 110 to which they are addressed.

The data ingest module 320 receives data from one or more sources that the cell tower 130 uses to provide a shared AR experience to players via the connected clients 110. In one embodiment, the data ingest module 320 receives real-time or substantially real-time information about real-world conditions (e.g., from third party services). For example, the data ingest module 320 might periodically (e.g., hourly) receive weather data from a weather service indicating weather conditions in the geographic area surrounding the cell tower. As another example, the data ingest module 320 might retrieve opening hours for a park, museum, or other public space. As yet another example, the data ingest module 320 may receive traffic data indicating how many vehicles are travelling on roads in the geographic area surrounding the cell tower 130. Such information about real-world conditions may be used to improve the synergy between the virtual and real worlds.

The AR environment module 330 manages AR environments in which players in the geographic area surrounding the cell tower 130 may engage in shared AR experiences. In one embodiment, a client 110 connects to the cell tower 130 while executing an AR game and the AR environment module 330 connects the client to an AR environment for the game. All players of the game who connect to the cell tower 130 may share a single AR environment or players may be divided among multiple AR environments. For example, there may be a maximum number of players in a particular AR environment (e.g., ten, twenty, one hundred, etc.). Where there are multiple AR environments, newly connecting clients 110 may be placed in a session randomly or the client may provide a user interface (UI) to enable the player to select which session to join. Thus, a player may elect to engage in an AR environment with friends. In some embodiments, players may establish private AR environments that are access protected (e.g., requiring a password or code to join).

In various embodiments, to enable AR objects (e.g., creatures, vehicles, etc.) to appear to interact with real world features (e.g., to jump over obstacles rather than going through them), the AR environment module 330 provides connected clients 110 with map data representing the real world in the proximity of the client (e.g., stored in the local data store 360). The AR environment module 330 may receive location data for a client 110 (e.g., a GPS location) and provide map data for the geographic area surrounding the client (e.g., within a threshold distance of the client's current position).

The received map data can include one or more representations of the real world. For example, the map data can include a point cloud model, a plane matching model, a line matching model, a geographic information system (GIS) model, a building recognition model, a landscape recognition model, etc. The map data may also include more than one representation of a given type at different levels of detail. For example, the map data may include two or more point cloud models, each including different number of points.

The client 110 may compare the map data to data collected by one or more sensors to refine the client's location. For example, by mapping the images being captured by a camera on the client 110 to a point cloud model, the client's location and orientation may be accurately determined (e.g., to within one centimeter and 0.1 degrees). The client 110 provides the determined location and orientation back to the AR environment module 330 along with any actions taken by the player (e.g., shooting, selecting a virtual item to interact with, dropping a virtual item, etc.). Thus, the AR environment module 330 can update the status of the game for all players engaged in the AR environment.

The map processing module 340 updates map data based on current conditions (e.g., data from the data ingest module 320). Because the real world is not static, the map data in the local data store 360 may not represent current real-world conditions. For example, the same park trail in Vermont may look very different in different seasons. In summer, the trail might be clear and the surrounding trees will be covered in foliage. In contrast, in winter, the trail may be blocked by drifts of snow and the trees may be bare. The map processing module 340 may transform the map data to approximate such changes.

In one embodiment, the map processing module 340 retrieves current condition data to identify a transformation and applies that transformation to the map data. The transformations for different conditions may be defined by heuristic rules, take the form of trained machine-learning models, or use a combination of both approaches. For example, the map processing module 340 might receive current weather condition data, select a transformation for the current weather conditions, and apply that transformation to the map data. Alternatively, the map processing module 340 may pre-calculate the transformed maps and store them (e.g., in the local data store 360). In this case, when a client 110 connects to the cell tower, the map processing module determines the current conditions, selects the appropriate pre-calculated version of the map data, and provides that version to the client.

The authority check module 350 maintains synchronization between game states of different clients 110. In one embodiment, the authority check module 350 confirms that game actions received from clients 110 are consistent with the game state maintained by the AR environment module 330. For example, if two players both try to pick up the same in-game item, the authority check module 350 determines which player receives the item (e.g., based on timestamps associated with the requests). As described, the use of a P2P protocol and local processing at the cell tower may significantly reduce the latency of a player's actions being seen at other players' clients 110. Therefore, the likelihood (and number) of instances of such conflicts arising and being resolved by the authority check module 350 is reduced. Therefore, the AR experience may be improved.

The authority check module 350 may also maintain synchronization between its copy of the state of the AR environment (the intermediate node state) and a master state maintained by the server 120. In one embodiment, the authority check module 350 periodically (e.g., every 1 to 10 seconds) receives global updates regarding the state of the AR environment from the server 120. The authority check module 350 compares these updates to the intermediate node state and resolves any discrepancies. For example, if a player's request to pick up an item was initially approved by the authority check module 350 but a game update from the server 120 indicates the item was picked up by another player (or otherwise made unavailable) before the player attempted to pick it up, the authority check module 350 might send an update to the player's client 110 indicating the item should be removed from the player's inventory.

This process may provide value for clients 110 located close to a boundary between coverage provided by different cell towers 130. In this case, players connected to different cell towers 130 may both be able to interact with the same virtual element. Thus, each individual cell tower 130 might initially approve conflicting interactions with the element, but the sever 120 would detect the conflict and send updates to resolve the conflict (e.g., instructing one of the cell towers to revoke its initial approval of the action and update its local state accordingly).

The local data store 360 is one or more non-transitory computer-readable media configured to store data used by the cell tower. In one embodiment, the stored data may include map data, current conditions data, a list of currently (or recently) connected clients 110, a local copy of the game state for the geographic region, etc. Although the local data store 360 is shown as a single entity, the data may be split across multiple storage media. Furthermore, some of the data may be stored elsewhere in the communication network and accessed remotely. For example, the cell tower 130 may access current condition data remotely (e.g., from a third-party server) as needed.

Example Method

Figure 4:
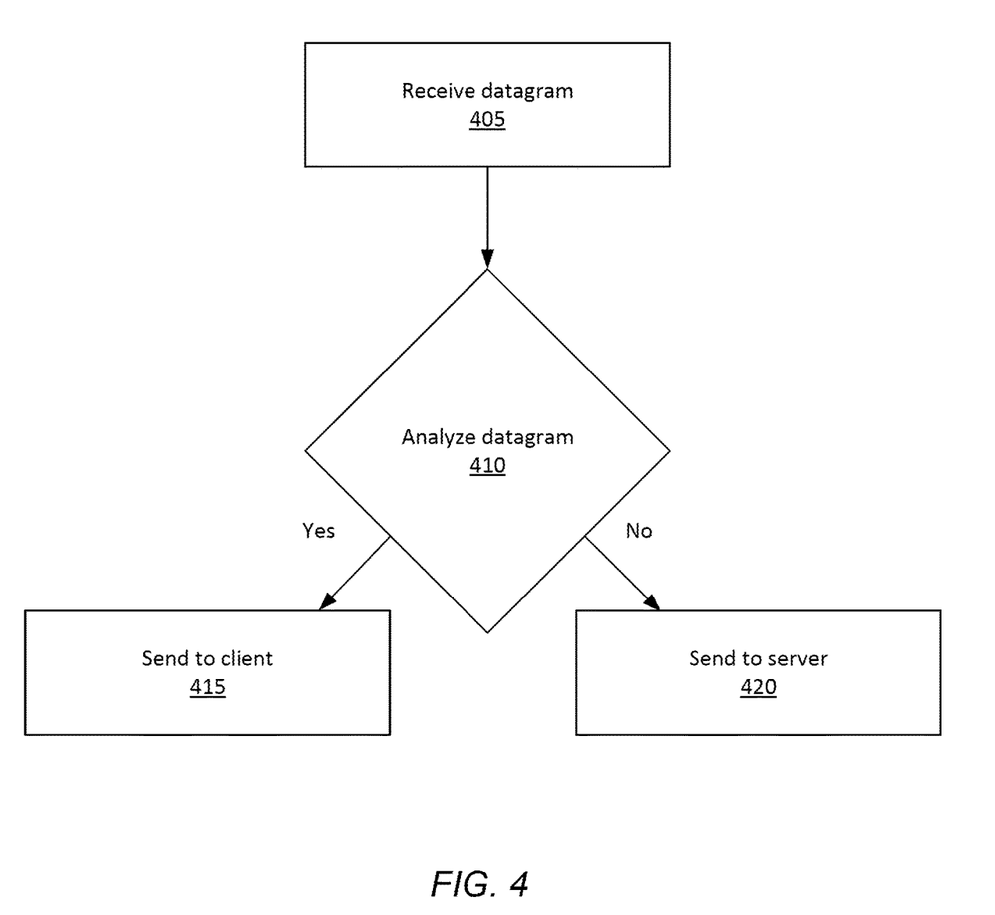
FIG. 4 illustrates a process for using a low-latency datagram-responsive computer network protocol, according to one embodiment.

FIG. 4 illustrates a process for using a low-latency datagram-responsive computer network protocol, according to one embodiment. A cell tower 130 receives 405 a datagram 200 addressed to a client 110A, the target client device. In other embodiments, the cell tower 130 may be another type of intermediary node that performs the same operations as the cell tower 130 of this embodiment. The datagram 200 may have been sent to the cell tower 130 from another client device, such as client 110B. The datagram 200 also describes an action that occurred in a shared AR environment, such as a one associated with a parallel-reality game in which players' locations in the real world correlate with their positions in the game world.

The cell tower 130 analyzes 410 the datagram 200 to determine whether the datagram is P2P based on its P2P flag 206. If the datagram 200 is P2P, the cell tower 130 sends 415 the datagram 200 to the client 110A to update a local state of the shared AR environment at the client 110A to show the action. If the datagram 200 is not P2P, the cell tower 130 sends 420 the datagram 200 to the server 120 to update a master state of the shared AR environment to show the action and its effects on the AR environment. In some embodiments, the cell tower 130 also sends some or all of the P2P datagrams to the server 120 after sending them to the client 110A. Thus, the clients 110 may synchronize their local states based on the P2P message while the server 120 maintains the master state that may be used to resolve discrepancies between local states of different clients. By bypassing the server 120 for P2P datagrams, the cell tower 130 may improve the latency of actions that occur in the AR environment when the datagram does not need processing by the server 120 before the local state of the AR environment is updated. In various embodiments, the local state is updated with a latency between 1 millisecond and 10 milliseconds, 1 millisecond and 15 milliseconds, 1 millisecond and 20 milliseconds, or 1 millisecond and 30 milliseconds.

In some embodiments, the cell tower 130 follows multiple steps to determine if a datagram 200 is P2P. The cell tower 130 analyzes the indicator, or P2P flag 206, to determine if the datagram 200 should be sent P2P. The cell tower 130 then determines whether client 110A is currently connected to the cell tower 130. If so, the cell tower 130 determines that the datagram 200 is P2P and can be sent straight to the client 110A instead of the server 120. If the cell tower 130 is not current connected to the client 110A, then the cell tower 130 sends the datagram 200 to the server 120, even if the P2P flag 206 indicates that the datagram is P2P.

The process in FIG. 4 may be further described in relation to an example shared AR environment that is incorporated into a parallel reality game where players throw balls of light at one another, which other players dodge or catch in real-time. When a sending player, associated with client 110B in this example, throws a ball of light at a target player, associated with client 110A, the client 110B creates a datagram 200 describing the action (e.g., throwing the ball of light). The action is between players and should occur quickly in the shared AR environment, so the client 110B indicates on the datagram 200 that the datagram 200 is P2P. The client 110B sends the datagram 200 to the cell tower 130, which determines what to do with the datagram 200. Since the datagram is P2P, the cell tower 130 sends the datagram 200 to client 110A instead of the server 120. Client 110A receives the datagram 200 and integrates the data from the payload 202 into the local state of the shared AR environment (e.g., shows the target player that the sending player threw a ball of light at them). By not sending the datagram 200 to the server 120, the latency is reduced. With a low enough latency, the action may appear in the target player's local presentation as though it happened in real-time, allowing the game play to continue more quickly. This may also allow players to experience a sense of direct interaction with each either. For example, in a virtual catch game, one player could throw a virtual ball and witness another player catch the virtual ball by placing their client 110 in the trajectory of the ball.

The cell tower 130 may send the datagram 200, or a copy of the datagram 200, to the server 120 after sending the datagram 200 to the client 110A. This way, the master state of the shared AR environment is updated to show that the sending player threw a ball of light at the target player. Sending the datagram 300 to the server 120 may provide a way to resolve conflicts between actions performed by different players that are closer together in time than the latency. Additionally, the server 120 may handle sending information from the datagram 200 to other cell towers when a client 110 is connected to another cell tower (e.g., when the client 110 switches to a neighboring cell tower, a player messages another player with a client 110 connected to a different cell tower, etc.). In some embodiments, the cell tower may determine a group of clients 110 that are currently connected to the cell tower 130 and the shared AR environment (e.g., all clients that are connected to the cell tower and the AR environment) and send the datagram to the group of clients 110 so that players associated with those clients 110 can see the action occur quickly, seemingly in real-time (e.g., with latency of less than 10 milliseconds).

Figure 5:
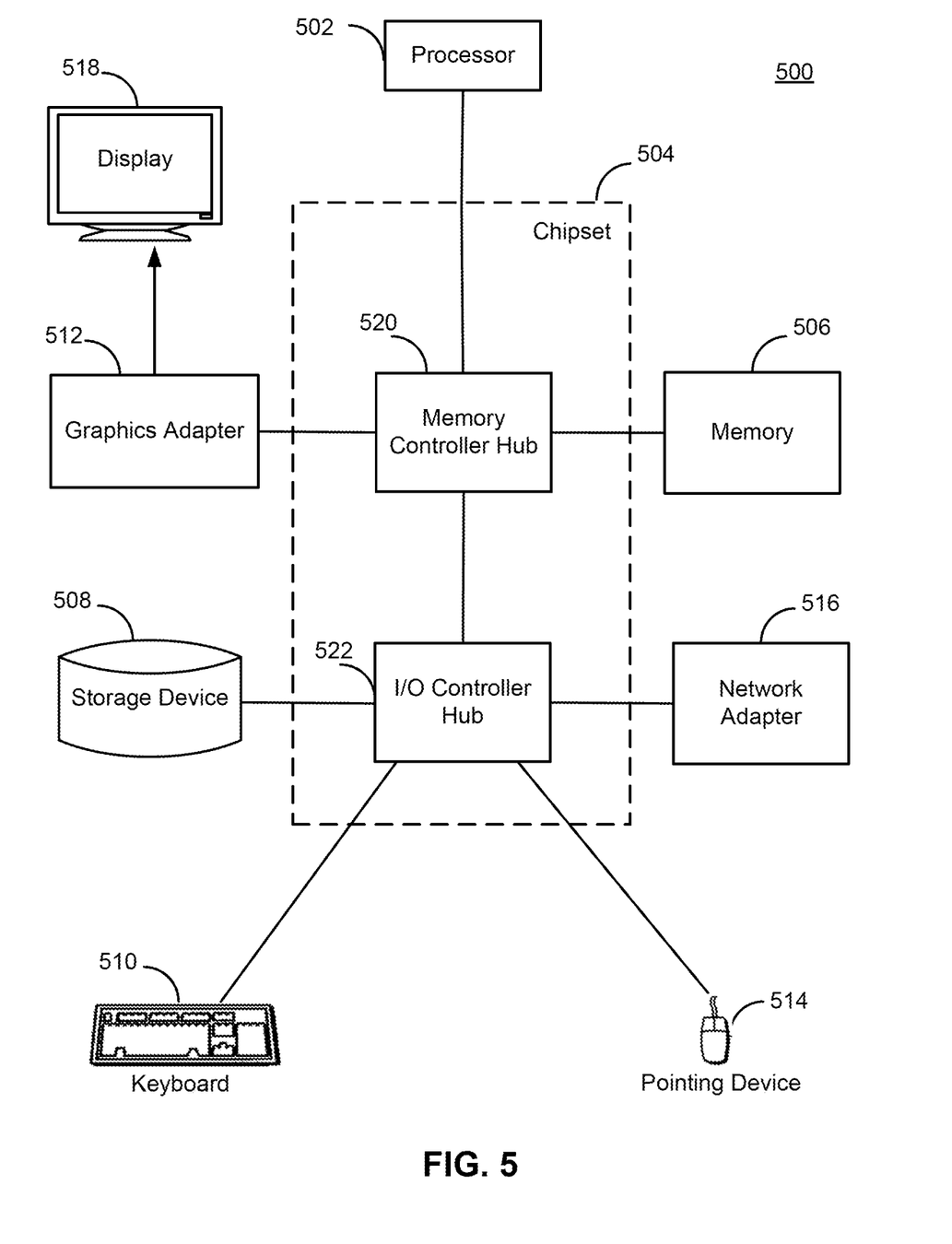
FIG. 5 is a high-level block diagram illustrating an example computer suitable for use within the computer network shown in FIG. 1, according to an embodiment.

FIG. 5 is a high-level block diagram illustrating an example computer 500 suitable for use within the computer network shown in FIG. 1, according to an embodiment. The example computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, touch-screen, or other type of pointing device, and is used in combination with the keyboard 510 (which may be an on-screen keyboard) to input data into the computer system 500. The graphics adapter 512 displays images and other information on the display 518. The network adapter 516 couples the computer system 500 to one or more computer networks.

The types of computers used by the entities of FIG. 1 can vary depending upon the embodiment and the processing power required by the entity. For example, a server 120 might include a distributed database system comprising multiple blade servers working together to provide the functionality described. Furthermore, the computers can lack some of the components described above, such as keyboards 510, graphics adapters 512, and displays 518.

Those skilled in the art can make numerous uses and modifications of and departures from the apparatus and techniques disclosed herein without departing from the described concepts. For example, components or features illustrated or described in the present disclosure are not limited to the illustrated or described locations, settings, or contexts. Examples of apparatuses in accordance with the present disclosure can include all, fewer, or different components than those described with reference to one or more of the preceding figures. The present disclosure is therefore not to be limited to specific implementations described herein, but rather is to be accorded the broadest scope possible consistent with the appended claims, and equivalents thereof.

What is claimed is:

1. A method, comprising:
    receiving, at a cell tower, a datagram from a sending client device that is connected to a shared augmented reality environment, the datagram including data regarding an action in the shared augmented reality environment and an indicator of whether the datagram is peer-to-peer;
    determining whether the datagram is peer-to-peer based on the indicator;
    responsive to determining that the datagram is peer-to-peer, sending the datagram to one or more target client devices connected to the shared augmented reality environment to update a local state of the shared augmented reality environment at the one or more target client devices in view of the action; and
    responsive to determining that the datagram is not peer-to-peer, sending the datagram to a server to update a master state of the shared augmented reality environment at the server in view of the action.

2. The method of claim 1, wherein the indicator is included in a header portion of the datagram.

3. The method of claim 1, wherein determining whether the datagram is peer-to-peer comprises:
    determining, based on the indicator, that the datagram should be sent peer-to-peer;
    identifying a specific target client device based on a header of the datagram;
    determining whether the specific target client device is currently connected to the cell tower; and
    responsive to the specific client device currently being connected to the cell tower, determining that the datagram is peer-to-peer.

4. The method of claim 3, wherein the datagram is sent to the server responsive to determining the specific target client device is not currently connected to the cell tower.

5. The method of claim 1, wherein the local state of the shared augmented reality environment is updated in view of the action with a latency between 1 millisecond and 20 milliseconds.

6. The method of claim 1, wherein sending the datagram to one or more target client devices comprises:
    identifying client devices currently connected to the cell tower and the shared augmented reality environment; and
    sending the datagram to the identified client devices to update each client device's local state of the shared augmented reality environment in view of the action.

7. The method of claim 1, wherein, responsive to determining that the datagram is peer-to-peer, the datagram is also sent to the server.

8. The method of claim 1, wherein determining whether the datagram is peer-to-peer comprises:
    comparing the indicator to a list of indicators maintained by the cell tower; and
    determining the datagram is peer-to-peer responsive to the indicator being included in the list of indicators.

9. The method of claim 8, wherein the indicator identifies at least one of: an AR session, a user, a device, or a game account.

10. A non-transitory computer-readable storage medium comprising instructions executable by a processor, the instructions comprising:
  instructions for receiving, at a cell tower, a datagram from a sending client device that is connected to a shared augmented reality environment, the datagram including data regarding an action in the shared augmented reality environment and an indicator of whether the datagram is peer-to-peer;
  instructions for determining whether the datagram is peer-to-peer based on the indicator;
  responsive to determining that the datagram is peer-to-peer, instructions for sending the datagram to one or more target client devices connected to the shared augmented reality environment to update a local state of the shared augmented reality environment at the one or more target client devices in view of the action; and
  responsive to determining that the datagram is not peer-to-peer, instructions for sending the datagram to a server to update a master state of the shared augmented reality environment at the server in view of the action.

11. The non-transitory computer-readable storage medium of claim 10, wherein the indicator is included in a header portion of the datagram.

12. The non-transitory computer-readable storage medium of claim 10, wherein determining whether the datagram is peer-to-peer comprises:
  determining, based on the indicator, that the datagram should be sent peer-to-peer;
  identifying a specific target client device based on a header of the datagram;
  determining whether the specific target client device is currently connected to the cell tower; and
  responsive to the specific client device currently being connected to the cell tower, determining that the datagram is peer-to-peer.

13. The non-transitory computer-readable storage medium of claim 10, wherein the datagram is sent to the server responsive to determining the specific target client device is not currently connected to the cell tower.

14. The non-transitory computer-readable storage medium of claim 10, wherein the local state of the shared augmented reality environment at the target client device is updated in view of the action with a latency between 1 millisecond and 20 milliseconds.

15. The non-transitory computer-readable storage medium of claim 10, wherein sending the datagram to one or more target client devices comprises:
  identifying client devices currently connected to the cell tower and the shared augmented reality environment; and
  sending the datagram to the identified client devices to update each client device's local state of the shared augmented reality environment in view of the action.

16. The non-transitory computer-readable storage medium of claim 10, wherein, responsive to determining that the datagram is peer-to-peer, the datagram is also sent to the server.

17. The non-transitory computer-readable storage medium of claim 10, wherein determining whether the datagram is peer-to-peer comprises:
  comparing the indicator to a list of indicators maintained by the cell tower; and
  determining the datagram is peer-to-peer responsive to the indicator being included in the list of indicators.

18. The non-transitory computer-readable storage medium of claim 10, wherein the indicator identifies at least one of: an AR session, a user, a device, or a game account.

19. A cell tower comprising:
  a local data store storing a list of client devices connected to the cell tower; and
  a routing module configured to perform operations comprising:
    receiving a datagram addressed to a target client device, wherein the datagram includes data regarding an action in a shared augmented reality environment;
    determining whether the target client device is in the list;
    determining, responsive to the target client device being in the list, that the datagram is peer-to-peer;
    responsive to determining that the datagram is peer-to-peer, sending the datagram to the target client device to update a local state of the shared augmented reality environment at the target client device in view of the action; and
    responsive to determining that the datagram is not peer-to-peer, sending the datagram to a server to update a master state of the shared augmented reality environment at the server in view of the action.

20. The cell tower of claim 19, wherein the datagram further includes an indicator of whether the datagram is peer-to-peer in a header portion of the datagram, and wherein determining that the datagram is peer-to-peer is further responsive to the indicator.

* * * * *